US010322796B2

(12) United States Patent
Lee

(10) Patent No.: US 10,322,796 B2
(45) Date of Patent: Jun. 18, 2019

(54) MULTI-ROTOR FLYING OBJECT

(71) Applicant: Sang-Hyun Lee, Suwon-si (KR)

(72) Inventor: Sang-Hyun Lee, Suwon-si (KR)

(*) Notice: Subject to any disclaimer, the term of this patent is extended or adjusted under 35 U.S.C. 154(b) by 307 days.

(21) Appl. No.: 15/107,171

(22) PCT Filed: Dec. 22, 2014

(86) PCT No.: PCT/KR2014/012634
§ 371 (c)(1),
(2) Date: Jun. 22, 2016

(87) PCT Pub. No.: WO2015/099375
PCT Pub. Date: Jul. 2, 2015

(65) Prior Publication Data
US 2016/0347443 A1  Dec. 1, 2016

(30) Foreign Application Priority Data

Dec. 23, 2013 (KR) .................. 10-2013-0161531

(51) Int. Cl.
| *B64C 15/12* | (2006.01) |
| --- | --- |
| *B64C 39/02* | (2006.01) |
| *B64D 47/08* | (2006.01) |
| *B64C 27/08* | (2006.01) |
| *B64C 27/52* | (2006.01) |
| *G05D 1/00* | (2006.01) |

(52) U.S. Cl.
CPC .............. *B64C 15/12* (2013.01); *B64C 27/08* (2013.01); *B64C 27/52* (2013.01); *B64C 39/024* (2013.01); *B64D 47/08* (2013.01); *G05D 1/0011* (2013.01); *B64C 2201/024* (2013.01); *B64C 2201/027* (2013.01); *B64C 2201/108* (2013.01); *B64C 2201/127* (2013.01)

(58) Field of Classification Search
CPC ......... B64C 15/12; B64C 27/52; B64C 27/08; B64C 39/024; B64C 2201/127; B64C 2201/027; B64C 2201/024; B64C 2201/108; G05D 1/0011; B64D 47/08
See application file for complete search history.

(56) References Cited

U.S. PATENT DOCUMENTS

| 4,537,372 A | 8/1985 | Forizs |
| 6,719,244 B1 | 4/2004 | Gress |
(Continued)

FOREIGN PATENT DOCUMENTS

KR  20-0300458 Y1  1/2003

OTHER PUBLICATIONS

International Search Report Corresponding to PCT/KR2014/012634 dated Jan. 26, 2015.
(Continued)

*Primary Examiner* — Valentina Xavier
(74) *Attorney, Agent, or Firm* — Davis & Bujold PLLC; Michael J. Bujold

(57) ABSTRACT

The present invention provides a multi-rotor flying object including: a body; a plurality of rotor units each including a propeller and a power unit for driving the propeller; and a steering unit including a connection member connecting the plurality of rotor units to each other and an actuator installed on the body and activating the connection member to allow the plurality of rotor units to be simultaneously inclined at the same angle with respect to the body.

22 Claims, 10 Drawing Sheets

(56) References Cited

U.S. PATENT DOCUMENTS

| | | | |
|---|---|---|---|
| 7,959,104 B2 | 6/2011 | Kuntz | |
| 8,453,962 B2 * | 6/2013 | Shaw | B64C 27/20 244/12.4 |
| 9,764,829 B1 * | 9/2017 | Beckman | B64C 15/14 |
| 2002/0104922 A1 * | 8/2002 | Nakamura | B64C 27/08 244/17.25 |
| 2007/0023581 A1 * | 2/2007 | La | B64C 27/20 244/165 |
| 2015/0175258 A1 * | 6/2015 | Lee | B64C 27/08 244/17.23 |
| 2015/0379876 A1 * | 12/2015 | Navot | G08G 5/0021 701/301 |
| 2016/0137298 A1 * | 5/2016 | Youngblood | B64C 39/024 244/17.23 |
| 2017/0274984 A1 * | 9/2017 | Beckman | B64C 11/50 |
| 2018/0083503 A1 * | 3/2018 | Beckman | H02K 1/2786 |
| 2018/0265189 A1 * | 9/2018 | Zhang | B64C 27/52 |

OTHER PUBLICATIONS

Written Opinion Corresponding to PCT/KR2014/012634 dated Jan. 26, 2015.

* cited by examiner

MULTI-ROTOR FLYING OBJECT

TECHNICAL FIELD

The present invention relates to a multi-rotor flying object capable of increasing a degree of freedom for a body while having a multi-rotor.

BACKGROUND ART

A multi-rotor flying object is generally a kind of helicopter having three or more rotors. The multi-rotor flying object may fly while changing a torque and a speed of the rotors and may be easily maintained and manipulated, as compared with a traditional single-rotor helicopter. Due to these advantages and the rapid development of an electronic technology, the multi-rotor flying object has been rapidly applied in various fields. In the past, military unmanned flying objects having a large size have been mainly used. However, recently, civil small unmanned flying objects have been mainly manufactured. The utilization of the small unmanned flying objects has variously increased from image photographing to transport of articles.

Among various types of small unmanned flying objects, a multi-rotor flying object called a quad-rotor has advantages more than those of other flying objects. The biggest advantage is that a mechanical mechanism is very simple. In the case of the quad-rotor, a trim does not need to be adjusted before flight, a mechanical vibration is not large, and the possibility that a component will be damaged due to fatigue is low. In addition, since it easy to mathematically model the quad-rotor due to a simple form, the quad-rotor is appropriate for automatic flight, and beginners may easily pilot the quad-rotor unlike other small flying objects requiring training for a long period of time in order to pilot the flying objects. Further, since the quad-rotor uses several small propellers, it is relatively safe for people unskilled in piloting or management. That is, everybody may easily pilot, maintain, repair, and manage the quad-rotor even though he/she does not have professional knowledge of a flying object or is not more trained in advance. Due to these advantages of the quad-rotor, an influence of the quad-rotor among the civil small unmanned flying objects has gradually increased.

Research into control and induction fields of the quad-rotor has been conducted in advance by many researchers. First, in the control field, there was an attempt to directly control a non-linear system using a back-stepping method or a sliding model method or linearize a quad-rotor model using feedback linearization and then control the quad-rotor model, in order to effectively treat characteristics of a non-linear model of the quad-rotor. In addition, in the induction field, a flip operation for rotating a moving body of the quad-rotor by 360 degrees or more in one side direction was performed or a rapid start-up following a specific trajectory and attitude and an elaborate start-up of exchanging a ball were enabled.

The multi-rotor flying object such as the quad-rotor may be currently controlled and induced precisely due to a contribution of many researches, but still needs to be functionally improved. Considering the fact that an accurate position and attitude of a flying object present on a three-dimensional space are represented by six variables, a multi-rotor flying object system ultimately becomes an under-actuated system in which a dimension of an input is smaller than a dimension of an output. This factor acts as a limitation in the control and the induction of the multi-rotor flying object. For example, a body of the multi-rotor flying object should be necessarily inclined forward in order to accelerate the multi-rotor flying object forward, and an acceleration in a forward direction is not absolutely generated in a state in which the multi-rotor flying object is inclined rearward. That is, it means that an attitude and an acceleration of the multi-rotor flying object may not be completely independent from each other.

Therefore, in the case in which a camera is attached to the body of the multi-rotor flying object to photograph a target, when the multi-rotor flying object changes a direction, the body of the multi-rotor flying object is also inclined, such that a photographing direction of the camera is out of the target to be photographed. In addition, since inclination of the entire multi-rotor flying object is required at the time of changing the direction, responsibility is relatively low, such that a rapid start-up is not easy.

DISCLOSURE

Technical Problem

An object of the present invention is to provide a multi-rotor flying object capable of rapidly changing a moving direction and maintaining horizontality of a body at the time of changing the moving direction.

Technical Solution

According to an aspect of the present invention, a multi-rotor flying object includes: a body; a plurality of rotor units each including a propeller and a power unit for driving the propeller; and a steering unit including a connection member connecting the plurality of rotor units to each other and an actuator installed on the body and activating the connection member to allow the plurality of rotor units to be simultaneously inclined at the same angle with respect to the body.

The plurality of rotor units may be disposed to be symmetrical to each other on the basis of the body.

The connection member may be connected to the center of gravity of the rotor unit.

The actuator may include a first motor and a second motor, and the connection member may include: a first connection unit transferring a torque by the first motor to the plurality of rotor units to rotate the plurality of rotor units around an axis in a first direction; and a second connection unit transferring a torque by the second motor to the plurality of rotor units to rotate the plurality of rotor units around an axis in a second direction corresponding to a direction intersecting with the first direction.

The second direction may be a direction perpendicular to each of the first direction and a shaft direction of the power unit.

The first connection unit and the second connection unit may be disposed in a symmetrical form on the basis of the body, respectively, to allow the body to maintain horizontality.

The first connection unit may include: a first link unit fixed to the rotor unit and installed on the body so as to be rotatable around the axis in the first direction; and a second link unit formed to transfer the torque by the first motor to the first link unit.

The second link unit may be connected to each of a shaft of the first motor and the first link unit to allow an angle by which the rotor unit rotates around the axis in the first direction to be the same as a rotation angle of the shaft of the first motor.

The second link unit may include: a first shaft fixed to the shaft of the first motor; a second shaft fixed to the first link unit and having the same length as that of the first shaft; and a third shaft disposed in parallel with a plane passing through the shaft of the first motor and the first link unit, and rotatably connected to each of the first shaft and the second shaft to allow an inclined angle of the first shaft to be the same as that of the second shaft in the case in which the shaft of the first motor rotates.

The second connection unit may include: a third link unit connected to the rotor unit so as to be rotatable around the axis in the second direction; and a fourth link unit transferring the torque by the second motor to the rotor unit to allow the rotor unit to be inclined.

The fourth link unit may be connected to each of a shaft of the second motor and the rotor unit to allow an angle by which the rotor unit rotates around the axis in the second direction to be the same as a rotation angle of the shaft of the second motor.

The third link unit may be rotatably connected to one point on a plane passing through the center of gravity of the rotor unit, and the fourth link unit may include: a fourth shaft fixed to the shaft of the second motor; a fifth shaft rotatably connected to the fourth shaft; a sixth shaft rotatably connected to the fifth shaft and formed to be slidable in the first direction; and a seventh shaft having the same length as that of the fifth shaft, and rotatably connected to each of the sixth shaft and the rotor unit, such that the seven shaft is displaced by sliding of the sixth shaft in the case in which the shaft of the second motor rotates, thereby forming an angle corresponding to an inclined angle of the fifth shaft.

The multi-rotor flying object may further include a control unit individually controlling rotation speeds of each of the power units of the plurality of rotor units.

The multi-rotor flying object may further include: a communication unit receiving a control signal for controlling the steering unit; and a control unit adjusting a rotation angle of a shaft of the actuator based on the control signal received from the communication unit.

According to another aspect of the present invention, a multi-rotor flying object includes: a body having a first motor and a second motor; a first rotor, a second rotor, a third rotor, and a fourth rotor arranged in a circumferential direction of the body so as to be spatially spaced apart from each other on the basis of the body; first to fourth swivel elements formed to support the first to fourth rotors to the body, respectively, and configured in a form in which the first to fourth rotors have a first tilting axis $X_1$ and a second tilting axis $X_2$ independent from the first tilting axis $X_1$, the first swivel element and the second swivel element being connected to each other and the third swivel element and the fourth swivel element being connected to each other; a first tilting operating unit connecting the first motor and the first to fourth swivel elements to each other so that the first to fourth rotors are simultaneously tilted around the first tilting axis $X_1$ by driving force of the first motor; and a second tilting operating unit connecting the second motor and the first to fourth swivel elements to each other so that the first to fourth rotors are simultaneously tilted around the second tilting axis $X_2$ by driving force of the second motor.

The first to fourth swivel elements may include: fixed frames each fixing the first to fourth rotors; yoke frames supporting the fixed frames so as to be pivotable around the second tilting axis $X_2$ and formed to provide pivot spaces of the first to fourth rotors; tie bars extended from the yoke frames; and pivot units formed to support the tie bars so as to be pivotable around the first tilting axis $X_1$, the tie bar of the first swivel element and the tie bar of the second swivel element may be connected to each other, and the tie bar of the third swivel element and the tie bar of the fourth swivel element may be connected to each other.

The first tilting operating unit may include: a first link having one end fixed to an output shaft of the first motor; second links connected to the other end of the first link and extended up to the tie bars; and third links each having one end connected to the tie bars and the other end connected to the second links.

The second link may be extended and formed in an integral shape so that one end thereof is connected to the third link fixed to a portion at which the tie bar of the first swivel element and the tie bar of the second swivel element are connected to each other and the other end thereof is connected to the third link fixed to a portion at which the tie bar of the third swivel element and the tie bar of the fourth swivel element are connected to each other, and the first link may include a first link swing unit fixed to the output shaft of the first motor, a first link driven unit connected to an end portion of the first link swing unit, and a first fixed member having one end connected to the first link driven unit and the other end fixed to the second link.

The second tilting operating unit may include: a pair of torque transfer members connected to both ends of the fixed frame in order to transfer a torque for pivoting the fixed frame around the first tilting axis; a yoke member having both ends connected to the pair of torque transfer members, moving in an axial direction, and formed to transfer force to the torque transfer members; a moving bar extended from the yoke member and formed to be movable in the axial direction; a slide bar having one end fixed to the moving bar and the other end bounded to the tie bar, such that the slide bar is slidably connected; and an operating link formed to move the slide bar by the second motor.

The yoke frames and the yoke members may be formed in a 'C' shape, respectively, and be disposed in parallel with each other.

The yoke frames and the yoke members may be formed in an 'O' shape, respectively, so as to completely enclose the first to fourth rotors, respectively, and be disposed in parallel with each other.

The operating link may include: a second link swing unit having one end fixed to an output shaft of the second motor; a second link driven unit having one end connected to the other end of the second link swing unit; a second fixed member having one end connected to the second link driven unit; and an extension type operating bar having one portion to which the second fixed member is fixed and having an end portion formed to apply force in a direction in which the slide bar is slid.

First couplers formed to enclose the slide bars may be further provided at end portions of the extension type operating bar.

The extension type operating bar may be extended and formed in an integral shape so that one end thereof is rotatably supported at a portion at which the tie bar of the first swivel element and the tie bar of the second swivel element are connected to each other and the other end thereof is rotatably supported at a portion at which the tie bar of the third swivel element and the tie bar of the fourth swivel element are connected to each other, fourth links may be connected to both ends of the extension type operating bar, fifth links may be connected to end portions of the fourth links, and second couplers formed to enclose the slide bars may be provided at end portions of the fifth links.

Advantageous Effects

In the multi-rotor flying object according to the present invention configured as described above, a moving direction may be rapidly changed at the time of flight of the multi-rotor flying object, and horizontality of a body may be maintained at the time of changing the moving direction. Therefore, in the case in which the multi-rotor flying object loads and transports an article, severe inclination of the multi-rotor flying object may be avoided, such that the article may be more safely transported. In addition, in the case in which a camera is attached to the body to photograph a target, the horizontality of the body is maintained even at the time of changing the moving direction, thereby making it possible to provide a more stable output image.

BEST MODE

Figure 1:
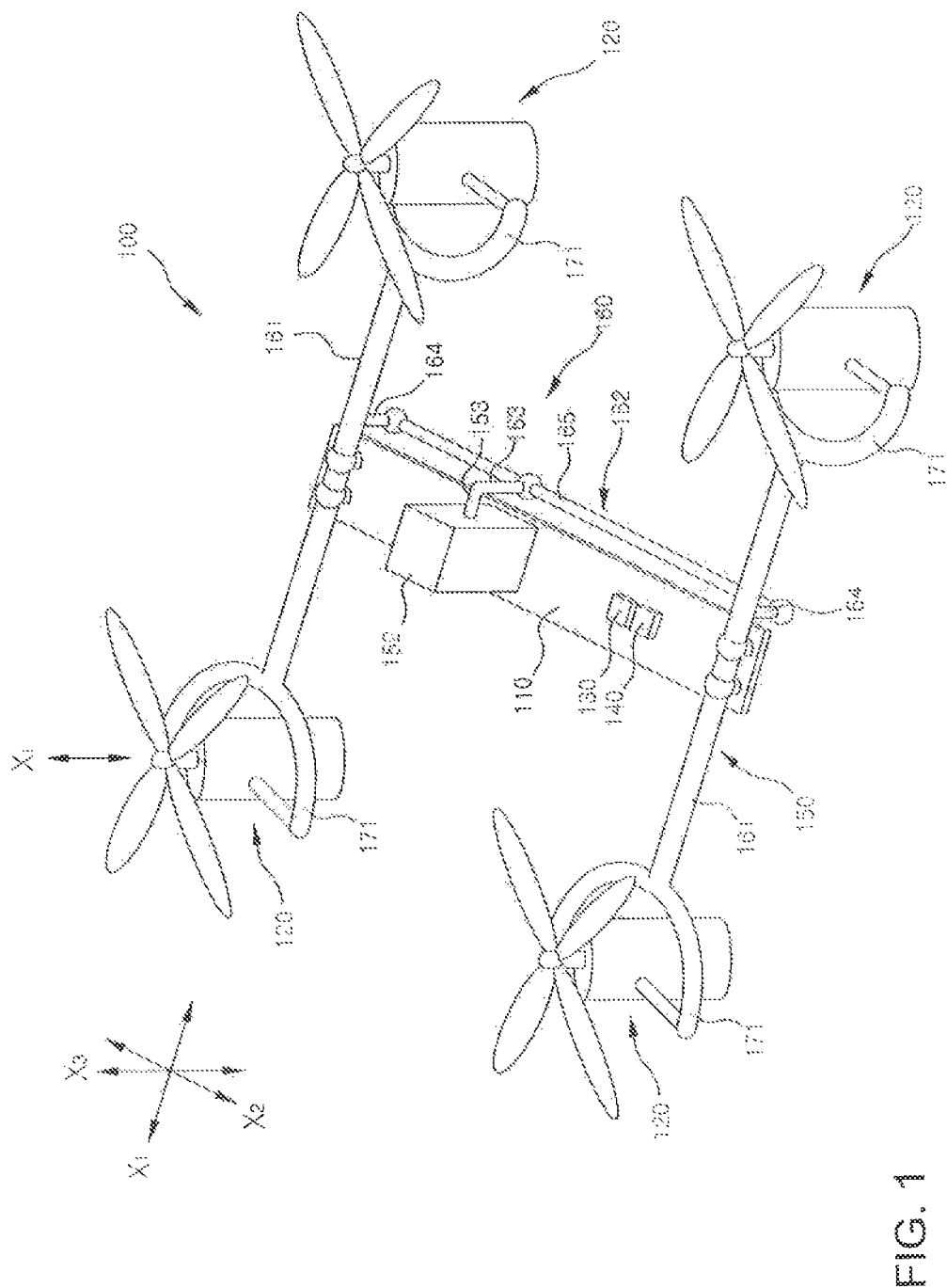
FIG. 1 is a perspective view of a multi-rotor flying object 100 according to a first exemplary embodiment of the present invention.

Hereinafter, multi-rotor flying objects according to exemplary embodiments of the present invention will be described in detail with reference to the accompanying drawings. Throughout the present disclosure, components that are the same as or similar to each other will be denoted by reference numerals that are the same as or similar to each other and a description therefor will be replaced by the first description, in different exemplary embodiments.

FIG. 1 is a perspective view of a multi-rotor flying object 100 according to a first exemplary embodiment of the present invention.

Referring to FIG. 1, the multi-rotor flying object 100 may include a body 110, rotor units 120, a communication unit 130, a control unit 140, and a steering unit 150.

The body 110 is a basic frame supporting various components of the multi-rotor flying object 100. The body 110 may include a camera or various task performing elements, and may be provided with a power element or a passenger room, a luggage room, or the like, according to use.

The rotor unit 120 is a component providing a thrust to the multi-rotor flying object 100. The number of rotor units 120 may be plural, more specifically, four. Since the multi-rotor flying object 100 related to the present invention includes the four rotor units 120 as described above, it may be called a 'quad-rotor helicopter'.

The four rotor units 120 may be disposed to be symmetrical to each other on the basis of the body 110, thereby making it possible to allow the body 110 to easily maintain horizontality at the time of flight of the multi-rotor flying object 100. The rotor unit 120 may include a propeller 121 and a power unit 123.

The propeller 121 may consist of a plurality of blades. The power unit 123 is a component for driving the propeller 121. The power unit 123 may be formed of a direct current (DC) motor, or the like, and provide power to the blades through a shaft 125 fixed to the center of the propeller 121.

The communication unit 130 is a component receiving control signals for controlling the power unit 123 and the steering unit 150. The communication unit 130 may receive the control signals transmitted by a remote controller, or the like, possessed by a user, and again transmit the received control signals to the control unit 140 to allow the control unit 140 to control the power unit 123 and the steering unit 150.

The control unit 140 is a component for controlling the power unit 123 and the steering unit 150. The control unit 140 may adjust rotation angles of a shaft 153 of a first motor 152 and a shaft 155 of a second motor 154 of a steering unit 150 to be described below based on the control signals received from the communication unit 130 described above. In addition, the control unit 140 may individually control rotation speeds of each of the power units 123. In detail, the control unit 140 increases or decreases a rotation speed of any one of the power units 123 to change a thrust between the plurality of rotor units 120, thereby making it possible to allow the body 110 to fly in a moving direction changed while being inclined together with the rotor units 120.

The steering unit 150 is a component for adjusting the moving direction of the multi-rotor flying object 100 at the time of flight of the multi-rotor flying object 100. The steering unit 150 may include an actuator 151 and a connection member 157.

The actuator 151 may be installed on the body 110, and include the first motor 152 and the second motor 154. Here, the first motor 152 and the second motor 154 may be formed of a servo-motor, or the like, receiving the control signal and precisely adjusting a rotation amount thereof.

The connection member 157 is a component transferring a torque by the actuator 151 to the rotor units 120. The connection member 157 may be connected to each of the actuator 151 and the four rotor units 120 to allow the fourth rotor units 120 to be inclined at the same angle depending on actuation of the actuator 151. The connection member 157 may include a first connection unit 160 and a second connection unit 170.

The first connection unit 160 may be connected to the first motor 152 to rotate the four rotor units 120 around an axis in a first direction $X_1$. The second connection unit 170 may be connected to the second motor 154 to rotate the four rotor units 120 around an axis in a second direction $X_2$, which is a direction intersecting with the first direction $X_1$. Here, the first direction $X_1$ may be any direction forming a predetermined angle with respect to the body 110, and the second direction $X_2$ may be a direction perpendicular to each of the first direction $X_1$ and a shaft direction $X_r$ of the power unit 123. In addition, the first connection unit 160 and the second connection unit 170 may be disposed in a symmetrical form on the basis of the body 110, respectively, to allow the body 110 to easily maintain horizontality in the case in which the multi-rotor flying object 100 flies. The steering unit 150 will be described below in detail with reference to FIGS. 2 to 6.

Hereinafter, a detailed configuration and operation scheme of the multi-rotor flying object 100 will be described with reference to FIGS. 2 and 3.

Figure 2:
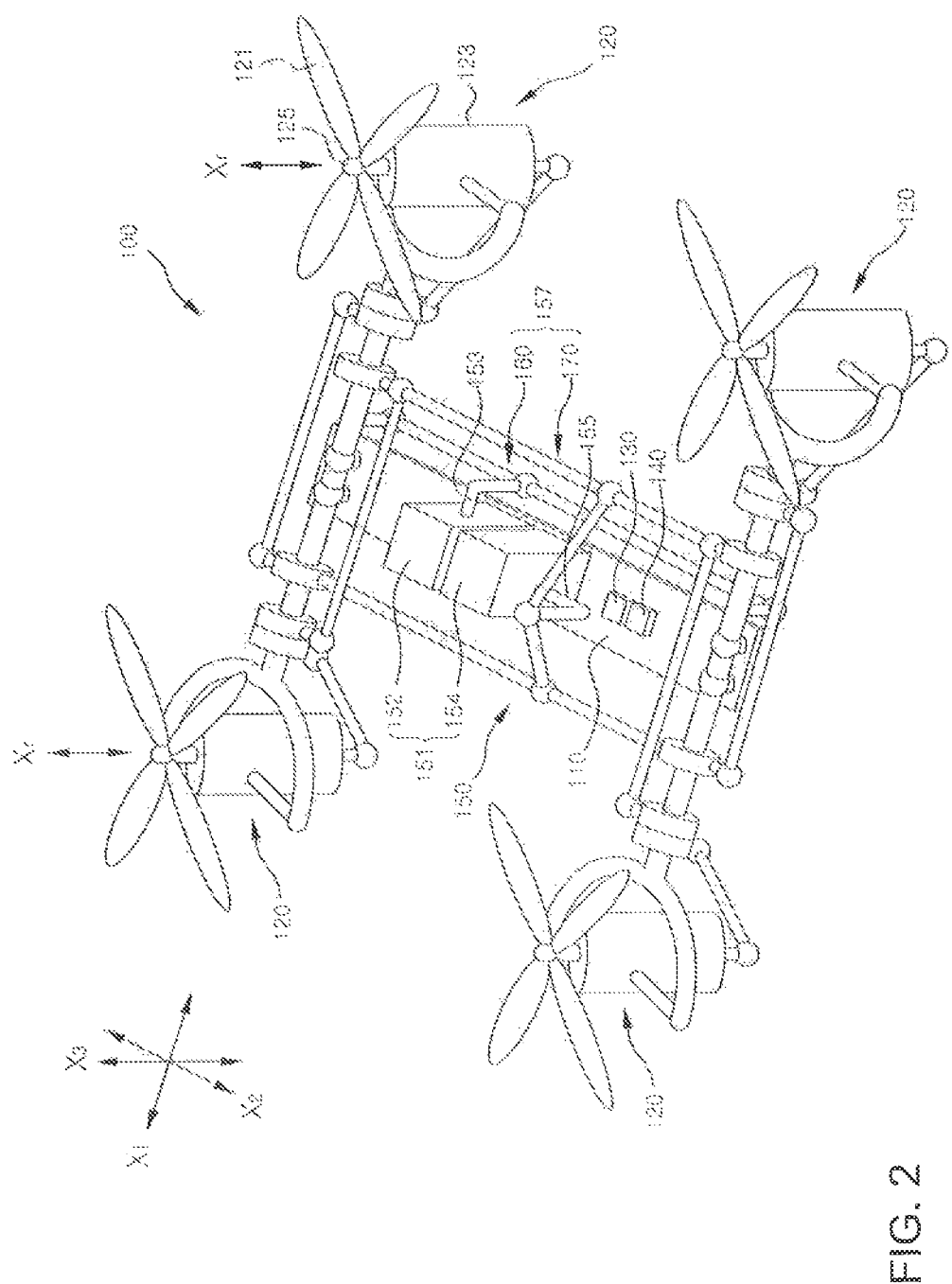
FIG. 2 is a perspective view of the multi-rotor flying object 100 of FIG. 1, illustrating a configuration of a steering unit 150 for rotating rotor units 120 around an axis in a first direction $X_1$.

FIG. 2 is a perspective view of the multi-rotor flying object 100 of FIG. 1, illustrating a configuration of a steering unit 150 for rotating rotor units 120 around an axis in a first direction $X_1$. In FIG. 2, only a component for rotating the rotor units 120 on the basis of the first direction $X_1$ is illustrated for convenience of explanation.

Referring to FIG. 2, the steering unit 150 may include the first motor 152 and the first connection unit 160.

The first motor 152 may be disposed so that the shaft 153 thereof is directed toward the first direction $X_1$.

The first connection unit 160 may include first link units 161 and a second link unit 162.

Two first link units 161 may be provided, and be installed on both ends of the body 110, respectively, so as to be rotatable around the axis in the first direction $X_1$. Third link units 171 to be described below may be extended from and formed at both ends of the first link units 161, respectively. Each of the third link units 171 may be rotatably connected to one point on a plane passing through the center of gravity of the rotor unit 120.

The second link unit 162 is a component for transferring a torque by the first motor 152 to the first link units 161. The second link unit 162 may include a first shaft 163, second shafts 164, and a third shaft 165. The first shaft 163 may be extended from the shaft 153 of the first motor 152 perpendicularly to the shaft 153. The second shaft 164 may be extended from the first link unit 161 perpendicularly to the first link unit 161. The third shaft 165 may be configured to connect the first shaft 163 and two second shafts 164 to each other.

Hereinafter, a detailed configuration and an operation scheme of the second link unit 162 will be described in detail with reference to FIG. 3.

Figure 3:
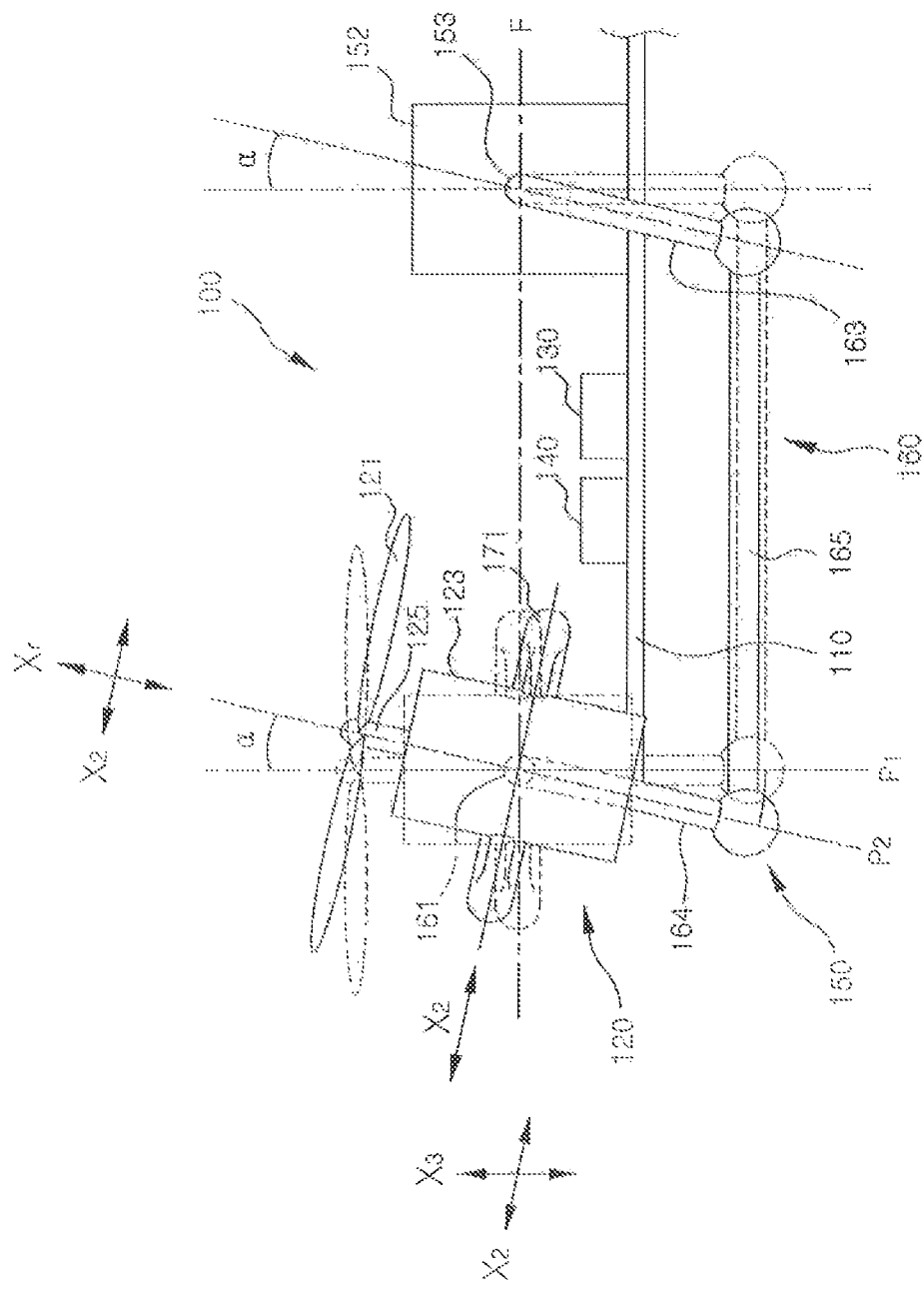
FIG. 3 is a side view of the multi-rotor flying object 100 of FIG. 1, illustrating a form in which the rotor unit 120 is rotated around the axis in the first direction $X_1$.

FIG. 3 is a side view of the multi-rotor flying object 100 of FIG. 1, illustrating a form in which the rotor unit 120 is rotated around the axis in the first direction $X_1$.

Referring to FIG. 3, the first shaft 163 and the second shaft 164 may be disposed in parallel with each other, and may have the same length. The third shaft 165 may be rotatably connected to each of the first shaft 163 and the second shaft 164 through a component such as a hinge, or the like. In addition, the first link unit 161 may be disposed on one plane F together with the shaft 153 of the first motor 152, and the third shaft 165 may be extended in a direction that is in parallel with the plane F.

Hereinafter, an operation scheme of the first motor 152 and the first connection unit 160 of the steering unit 150 will be described.

Before the multi-rotor flying object 100 is operated, the rotor unit 120 may be disposed so that the shaft 125 of the power unit 123 is in parallel with a third direction $X_3$, which is a direction perpendicular to the ground. In this case, an attitude of the rotor unit 120 may be called a 'first position $P_1$'. At the first position $P_1$, the first shaft 163 and the second shaft 164 may be disposed to be in parallel with the third direction $X_3$.

When the user transmits the control signal to the multi-rotor flying object 100 through the remote controller, or the like, the control unit 140 may receive the control signal and start to drive the power unit 123. Here, in the case in which the rotor unit 120 is positioned at the first position $P_1$, the multi-rotor flying object 100 may vertically take off or land or vertically fly in the third direction $X_3$.

When the user again transmits a control signal related to a moving direction of the multi-rotor flying object 100 through the remote controller, the control unit 140 may actuate the first motor 152 based on the control signal. When the first motor 152 is actuated to rotate the shaft 153 of the first motor 152 by a first angle α, the first shaft 163 may also be inclined at the first angle α with respect to an axis in the third direction $X_3$. Here, an angle formed by the shafts with respect to the axis in the third direction $X_3$ may be called an 'inclined angle'.

When the first shaft 163 is inclined, the second shaft 164 connected to the first shaft 163 through the third shaft 165 may also be inclined together with the first shaft 163. Here, the second shaft 164 has the same length as that of the first shaft 163, as described above, and the third shaft 165 may be disposed in parallel with the plane F passing through the shaft 153 of the first motor 152 and the first link unit 161. Therefore, an inclined angle of the second shaft 164 may be the first angle α. According to this configuration, since an angle by which the rotor unit 120 rotates around the axis in the first direction $X_1$ is the same as a rotation angle of the shaft 153 of the first motor 152, a steering angle of the rotor unit 120 may be readily controlled. Here, an attitude of the rotor unit 120 at which the shaft 125 of the power unit 123 is inclined at the first angle α with respect to the third direction $X_3$ may be called a 'second position P2'. As described above, since the second direction $X_2$ is perpendicular to the shaft direction $X_r$, of the power unit 123, the axis in the second direction $X_2$ may be inclined at the first angle α with respect to the axis in the third direction $X_3$ at the second position P2.

According to the configuration described above, the steering unit 150 may simultaneously incline only the four rotor units 120 in one direction without having an influence on the body 110, thereby making it possible to allow the multi-rotor flying object 100 to fly in a state in which the body 110 maintains the horizontality. Here, since the first link unit 161 is connected to the center of gravity of the rotor unit 120 through the third link unit 171 as described above, even in the case in which the rotor unit 120 is inclined by rotation of the first link unit 161, a change amount of force applied to the body 110 by the inclination of the rotor unit 120 may be minimized, which does not substantially have an influence on the horizontality of the body 110.

Although an operation scheme of only one rotor unit 120 has been described hereinabove, another rotor unit 120 (see FIG. 2) disposed at an opposite side to the rotor unit 120 described above on the basis of the first motor 152 may be driven in the same scheme as the operation scheme described above. In this case, a first link unit 161 (see FIG. 2), which is the center of rotation of another rotor unit 120, may be disposed on the plane F described above or be disposed at a position different from the plane F described above.

Figure 4:
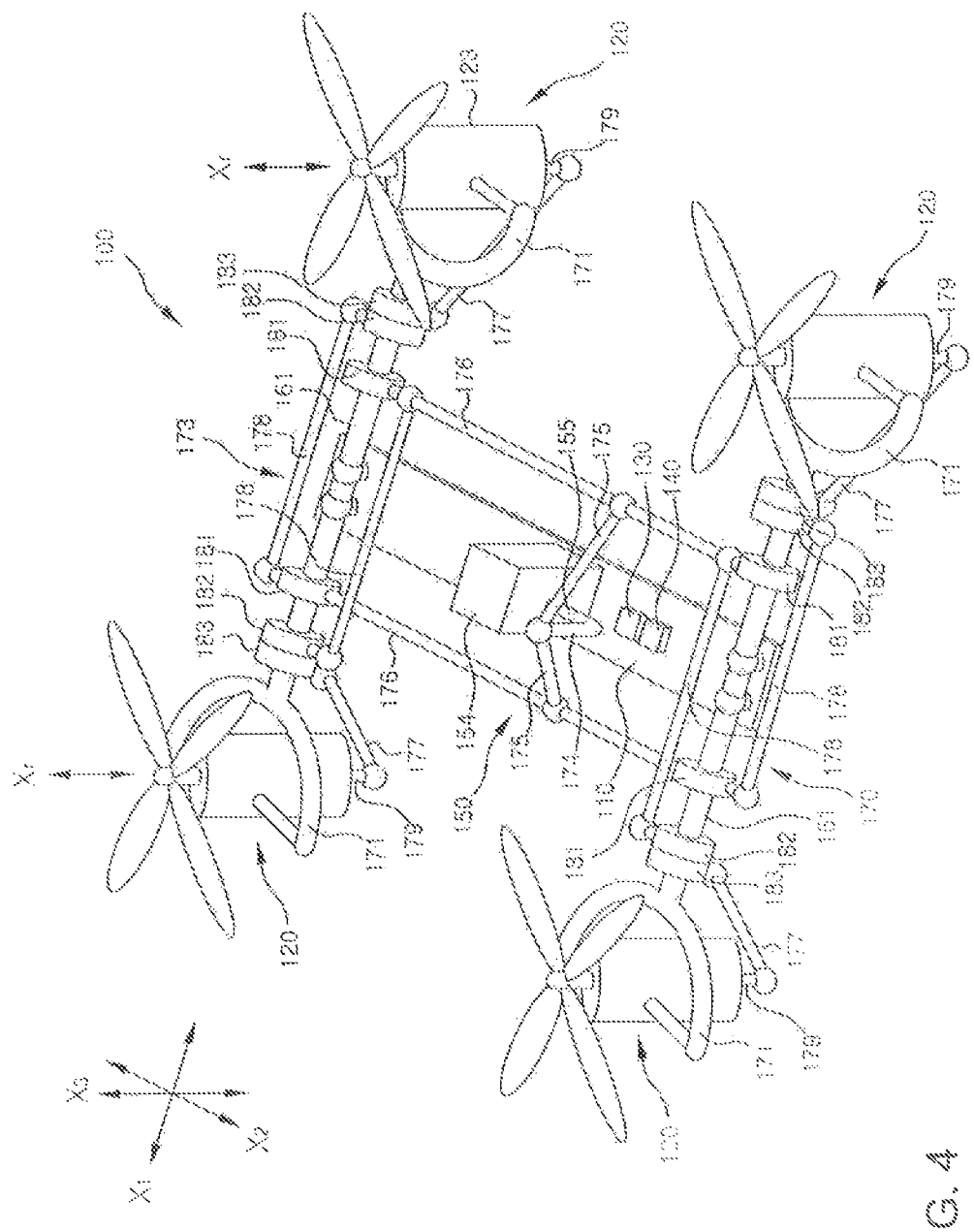
FIG. 4 is a perspective view of the multi-rotor flying object 100 of FIG. 1, illustrating a configuration of a steering unit 150 for rotating rotor units 120 around an axis in a second direction $X_2$.

FIG. 4 is a perspective view of the multi-rotor flying object 100 of FIG. 1, illustrating a configuration of a steering unit 150 for rotating rotor units 120 around an axis in a second direction $X_2$. In FIG. 4, only a component for rotating the rotor units 120 on the basis of the second direction $X_2$ is illustrated for convenience of explanation.

Referring to FIG. 4, the steering unit 150 may include the second motor 154 and the second connection unit 170.

The second motor 154 may include the shaft 155. The shaft 155 may be configured to rotate around a direction perpendicular to each of the first direction $X_1$ and the third direction $X_3$.

The second connection unit 170 may include third link units 171 and fourth link units 173.

The third link units 171 may be fixed to both ends of the first link unit 161, be formed in a C shape, and be connected to the rotor units 120 so as to be rotatable around the axis in the second direction $X_2$. Here, a point at which the third link unit 171 is connected to the rotor unit 120 may be one point on a plane passing through the center of gravity of the rotor unit 120.

The fourth link unit 173 is a component for transferring a torque by the second motor 154 to the rotor unit 120. The fourth link unit 173 may include a fourth shaft 174, a fifth shaft 175, a sixth shaft 176, a seventh shaft 177, an eighth shaft 178, a fixed shaft 179, a first bearing 181, a second bearing 182, and a third bearing 183.

The fourth shaft 174 may be extended from the shaft 155 of the second motor 154 perpendicularly to the shaft 155.

The fifth shaft 175 may be rotatably connected to the fourth shaft 174 through a hinge, or the like.

The sixth shaft 176 may be rotatably connected to the fifth shaft 175 through a hinge, or the like, and be extended in a direction perpendicular to each of the first direction $X_1$ and the third direction $X_3$, such that both ends thereof may be slidably connected to the first link units 161. Therefore, the sixth shaft 176 may be configured to be slid in the first direction $X_1$.

The seventh shaft 177 may be rotatably connected to the fixed shaft 179 fixed to the rotor unit 120. The seventh shaft 177 may have the same length as that of the fifth shaft 175.

The eighth shaft 178 may be configured to connect the sixth shaft 176 and the seventh shaft 177 to each other. To this end, the eighth shaft 178 may be extended in the first direction $X_1$.

The fixed shaft 179 may be fixed to a lower end of the rotor unit 120, and be extended in the same direction as the shaft direction $X_P$ of the power unit 123.

Each of the first bearing 181, the second bearing 182, and the third bearing 183 may be slidably fitted onto the first link unit 161 in the first direction $X_1$. One end portion of the eighth shaft 178 and the sixth shaft 176 are fixed to the first bearing 181. The other end portion of the eighth shaft 178 is fixed to the second bearing 182. The seventh shaft 177 may be rotatably connected to the third bearing 183 through a hinge, or the like.

In order to simplify a configuration, the sixth shaft 176 may be formed integrally with the eighth shaft 178. In this case, the sixth shaft 176 may generally have an 'L' shape.

Hereinafter, an operation scheme of the second motor 154 and the second connection unit 170 will be described in detail with reference to FIG. 5.

Figure 5:
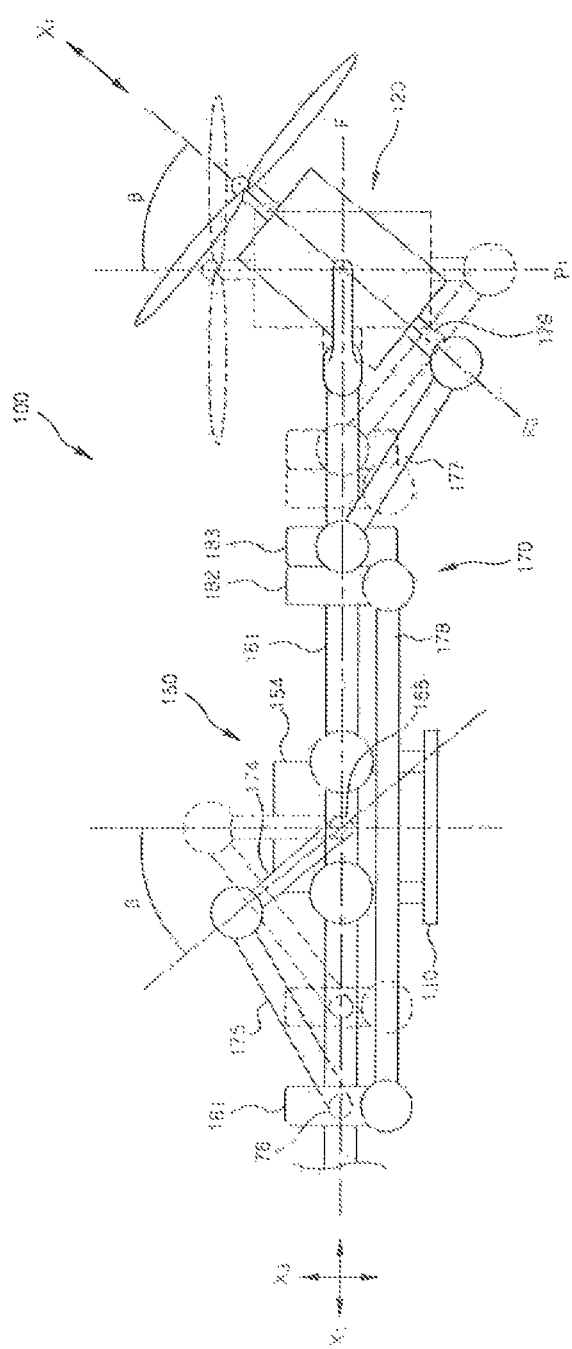
FIG. 5 is a front view of the multi-rotor flying object 100 of FIG. 1, illustrating a form in which the rotor unit 120 is rotated around the axis in the second direction $X_2$.

FIG. 5 is a front view of the multi-rotor flying object 100 of FIG. 1, illustrating a form in which the rotor unit 120 is rotated around the axis in the second direction $X_2$. Since the fourth link units 173 may be disposed to be approximately symmetrical to each other on the basis of the body 110, only a configuration of one of the fourth link units 173 will be illustrated and described in FIG. 5 for convenience of explanation.

Referring to FIG. 5, before the multi-rotor flying object 100 is operated, the rotor unit 120 may be positioned at the first position $P_1$, as described above. At the first position $P_1$, the fourth shaft 174 and the fixed shaft 179 may be in parallel with the third direction $X_3$.

When the user transmits the control signal through the remote controller, the control unit 140 may actuate the second motor 154 based on the control signal. When the second motor 154 is actuated to rotate the shaft 155 of the second motor 154 by a second angle β, the fourth shaft 174 may also be inclined at the second angle β with respect to the axis in the third direction $X_3$.

When the fourth shaft 174 is inclined, the fifth shaft 175 connected to the fourth shaft 174 is also displaced, such that the sixth shaft 176 connected to the fifth shaft 175 is also slid together with the first bearing 181 in the first direction $X_1$. Therefore, the eighth shaft 178 connected to the first bearing 181 also moves in the first direction $X_1$, and the second bearing 182 and the third bearing 183 that are connected to the eighth shaft 178 are also slid in the same direction. Here, when the third bearing 183 is slid, the seventh shaft 177 is displaced, such that the rotor unit 120 connected to the fixed shaft 179 is also inclined.

In this case, the seventh shaft 177 has the same length as that of the fifth shaft 175 as described above, and a length from the center of gravity of the rotor unit 120 to an end portion of the fixed shaft 179 is the same as a length of the fourth shaft 174. Therefore, an inclined angle of the seventh shaft 177 may be the same as that of the fifth shaft 175. According to this configuration, since an angle by which the rotor unit 120 rotates around the axis in the second direction $X_2$ is the second angle β, which corresponds to a rotation angle of the shaft 155 of the second motor 154, a steering angle of the rotor unit 120 may be readily controlled. Here, an attitude of the rotor unit 120 at which the shaft 125 of the power unit 123 is inclined at the second angle β, with respect to the third direction $X_3$ may be called a 'third position P3'. In addition, although an operation scheme of the rotor unit 120 in a state in which the first motor 152 is not driven has been described in FIG. 5, in the case in which the second motor 154 is driven in a state in which the first motor 152 is driven, the above-mentioned second angle β formed by the shaft 125 of the power unit 123 may be an angle with respect to a plane formed on the basis of the first direction $X_1$ and the third direction $X_3$.

As described above, according to the present exemplary embodiment, only the rotor unit 120 may rotate around the axes in the first direction $X_1$ and the second direction $X_2$ with respect to the body 110 by the steering unit 150, such that movement of six degrees of freedom is possible. In other words, according to the present exemplary embodiment, the rotor unit 120 may also rotate in directions of Eulerian angles θ and Φ, a fully actuated system in which a dimension of a control input and a dimension of an output are the same as each other (six-dimension) may be implemented.

According to the configuration of the multi-rotor flying object 100 configured as described above, a thrust by the propeller 121 may be adjusted in a desired direction without inclining the body 110. Therefore, an attitude angle of the body 110 may be freely adjusted regardless of an acceleration direction of the body 110, thereby making it possible to enable a start-up in more various schemes. In addition, it is more excellent in terms of responsibility of a control to move only the rotor units 120 having a relatively small inertial moment than to move the entire multi-rotor flying object 100 having a large inertial moment, and an attitude of the entire multi-rotor flying object 100 does not need to be changed whenever an acceleration is changed, thereby making it possible to enable a more stable and rapid start-up.

In detail, in the case in which a camera is attached to the body 110 to photograph a target, a change amount of a photographing angle of the camera is minimized even at the time of charging a direction of the body 110, such that a separate apparatus for maintaining horizontality of the camera does not need to be provided, and the target may be continuously tracked. Furthermore, the multi-rotor flying object 100 may rapidly avoid an external object rapidly approaching the multi-rotor flying object 100, and severe inclination of the multi-rotor flying object 100 when the multi-rotor flying object 100 transports an article may be avoided, thereby making it possible to more safely perform a task.

Figure 6:
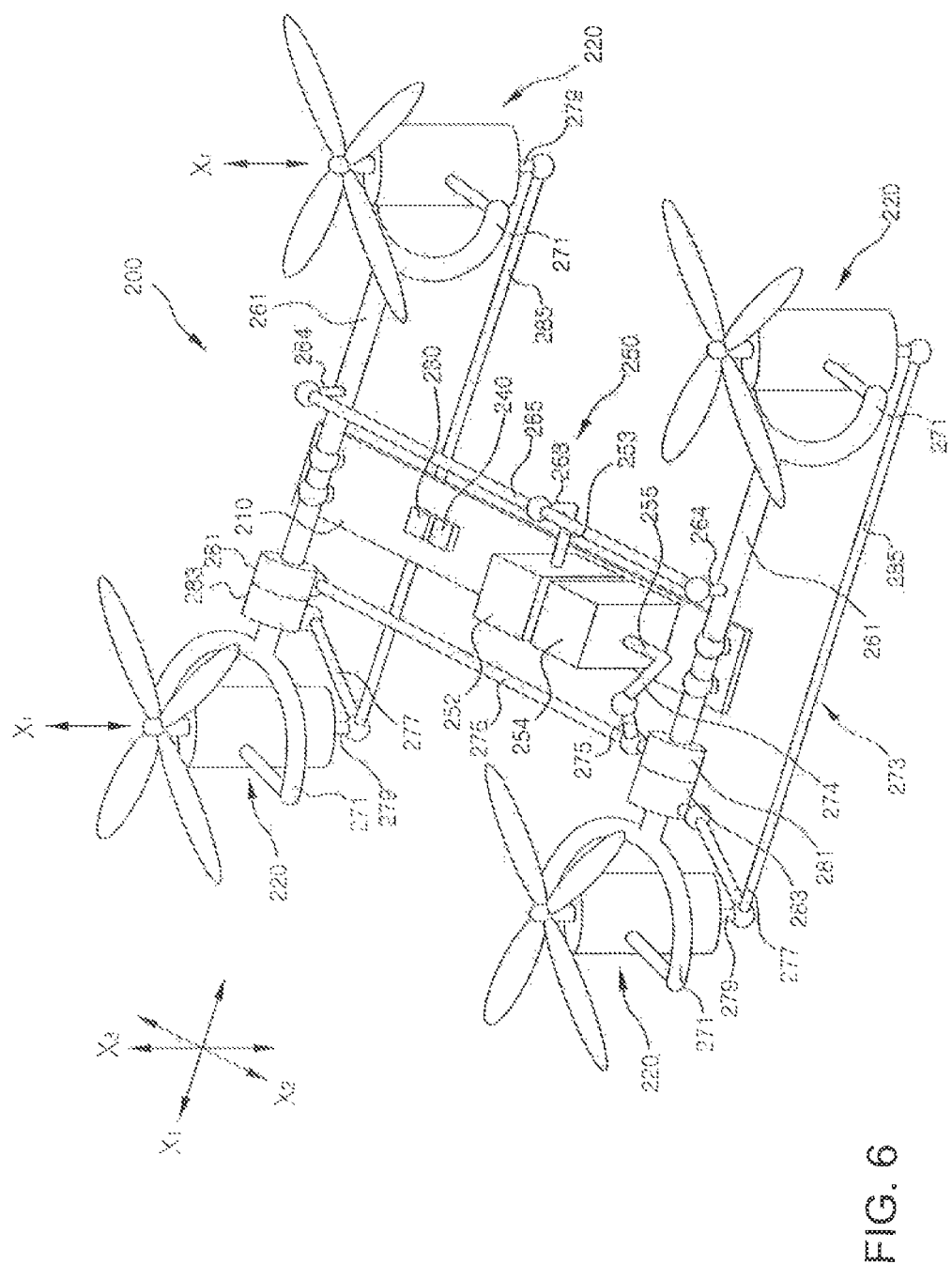
FIG. 6 is a perspective view of a multi-rotor flying object 200 according to a second exemplary embodiment of the present invention.

FIG. 6 is a perspective view of a multi-rotor flying object 200 according to a second exemplary embodiment of the present invention.

Referring to FIG. 6, a fourth link unit 273 of the multi-rotor flying object 200 may include ninth shafts 285. The number of ninth shafts 285 may be two, and the two ninth shafts 285 may connect fixed shafts 279 of rotor units 220 adjacent to each other in the first direction $X_1$ to each other, respectively. Therefore, fourth rotor units 220 may be inclined at the same angle around the axis in the second direction $X_2$.

According to the present exemplary embodiment, the fourth link unit 273 may include only one fifth shaft 275, one sixth shaft 276, and one seventh shaft 277 unlike the fourth link units 173 according to the above-mentioned exemplary embodiment disposed to be symmetrical to each other and configured in a pair, such that a manufacturing process and a configuration of the fourth link unit 273 may be further simplified.

Figure 7:
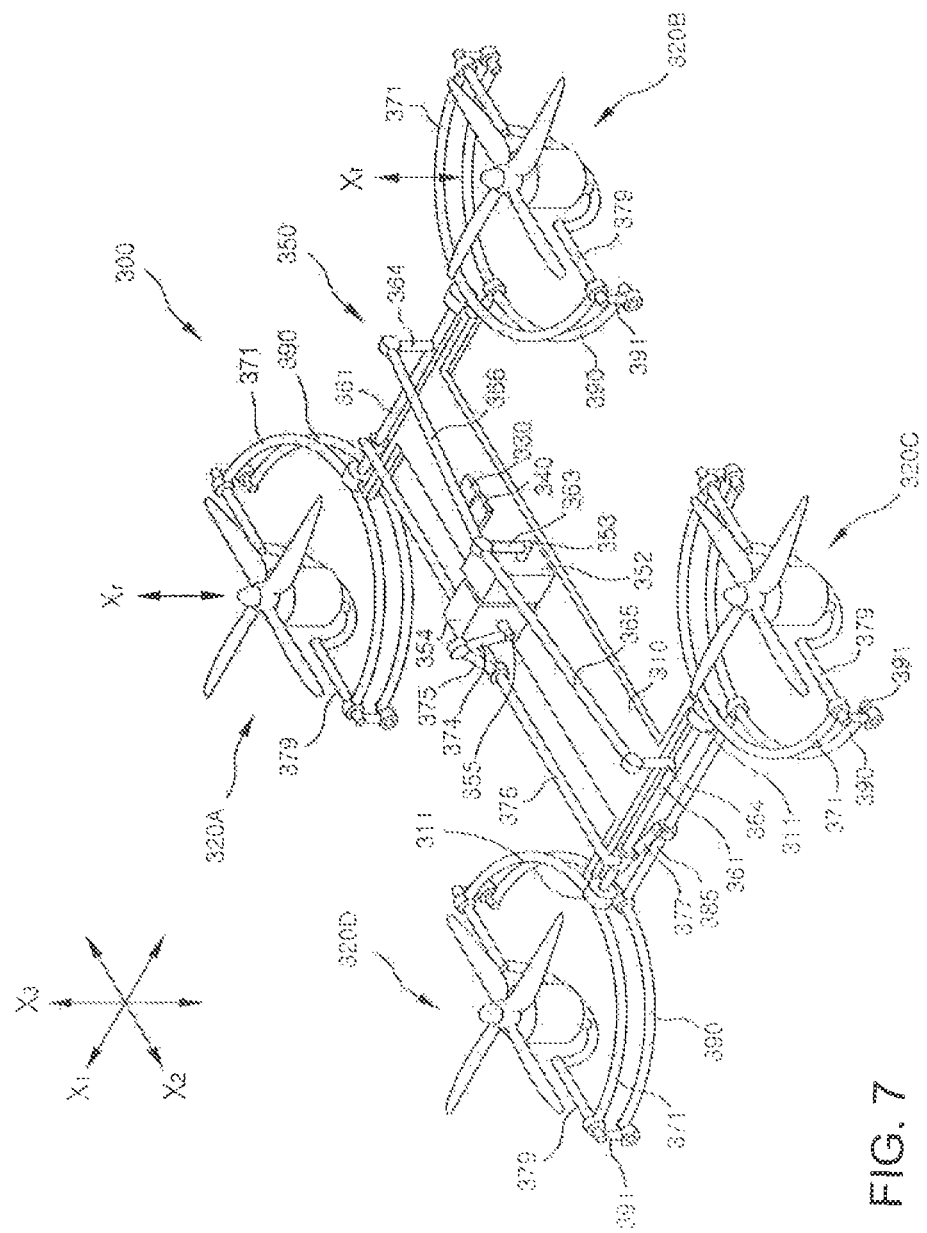
FIG. 7 is a perspective view of a multi-rotor flying object 300 according to a third exemplary embodiment of the present invention.

FIG. 7 is a perspective view of a multi-rotor flying object 300 according to a third exemplary embodiment of the present invention. The present exemplary embodiment will be described in an aspect different from those of the above-mentioned exemplary embodiments.

Referring to FIG. 7, the multi-rotor flying object 300 includes a body 310 having a first motor 352 and a second motor 354, and a first rotor 320A, a second rotor 320B, a third rotor 320C, and a fourth rotor 320D arranged in a circumferential direction of the body 310 so as to be spatially spaced apart from each other on the basis of the body 310. The first to fourth rotors 320A, 320B, 320C, and 320D are supported to the body 310 by first to fourth swivel elements, respectively. Each of the first to fourth swivel elements may be configured in a form in which the first to fourth rotors 320A, 320B, 320C, and 320D may have a first tilting axis $X_1$ and a second tilting axis $X_2$ independent from the first tilting axis $X_1$. Therefore, in the case in which the rotors 320A, 320B, 320C, and 320D rotate around the first tilting axis $X_1$, the second tilting axis $X_2$ may also rotate. The first swivel element and the second swivel element are connected to each other, and the third swivel element and the fourth swivel element are also connected to each other.

A first tilting operating unit connecting the first motor 352 and the first to fourth swivel elements to each other so that the first to fourth rotors 320A, 320B, 320C, and 320D may be simultaneously tilted around the first tilting axis $X_1$ by driving force of the first motor 352 is provided.

In addition, a second tilting operating unit connecting the second motor 354 and the first to fourth swivel elements to each other so that the first to fourth rotors 320A, 320B, 320C, and 320D may be simultaneously tilted around the second tilting axis $X_2$ by driving force of the second motor 354 is also provided.

Each of the first to fourth swivel elements is configured in a form in which it includes a fixed frame 379, a yoke frame 371, a tie bar 361, and a pivot unit 311. Both ends of the fixed frame 379 are arranged in a direction of the second tilting axis $X_2$, and are positioned at approximately the center of the rotor unlike the above-mentioned exemplary embodiment so as to reduce a rotation space of the rotor. To this end, the fixed frame 379 may include an arch shape unit formed at the center thereof.

The yoke frames 371 include 'C' shapes so as not to form obstacles of the first to fourth rotors 320A, 320B, 320C, and 320D pivoting around the second tilting axis $X_2$, unlike FIG. 1 or FIG. 6.

The tie bar 361 is extended from the yoke frame 371, and the pivot unit 311 is formed to support the tie bar 361 so that the tie bar 361 is pivotable around the first tilting axis $X_1$.

The tie bar 361 supporting the first rotor 320A and the tie bar 361 supporting the second rotor 320B are connected to each other, and the tie bar 361 supporting the third rotor 320C and the tie bar 361 supporting the fourth rotor 320D are also connected to each other. Therefore, the first rotor 320A and the second rotor 320B may simultaneously pivot around the first tilting axis $X_1$ by the tie bars 361 connecting the first rotor 320A and the second rotor 320B to each other, and the third rotor 320C and the fourth rotor 320D may also simultaneously pivot around the first tilting axis $X_1$ by the tie bars 361 connecting the third rotor 320C and the fourth rotor 320D to each other.

The first tilting operating unit may include a first link 363 having one end fixed to an output shaft 353 of the first motor 352, second links 365 and 366 connected to the other end of the first link 363 and extended up to the tie bars 361, and third links 364 each having one end fixed to the tie bars 361 and the other end connected to the second links 365 and 366. As a result, when the output shaft 353 of the first motor 352 rotates, the second links 365 and 366 move. The movement of the second links 365 and 366 acts as a torque rotating the third links 364 and the tie bars 361. Rotation angles applied to the tie bars 361 are output as tilting angles of the first to fourth rotors 320A, 320B, 320C, and 320D depending on the first tilting axis $X_1$.

The second tilting operating unit may include torque transfer members 391, a yoke member 390, a moving bar 385, a slide bar 377, and an operating link.

The torque transfer members 391 may be provided in a pair so as to be connected to both ends of the fixed frame 379 in order to transfer a torque for pivoting the fixed frame 379 around the first tilting axis $X_1$.

The yoke member 390 has both ends each connected to the torque transfer members 391, moves in an axial direction, and is formed to transfer force to the torque transfer members 391. In detail, the yoke member 390 may include a 'C' shape corresponding to that of the yoke frame 371, and may be disposed in parallel with the yoke frame 371. The shapes and the dispositions of the yoke members 390 and the yoke frames 371 described above are advantageous in minimizing generation of obstacles and extending pivot angles at the time of pivoting the first to fourth rotors 320A, 320B, 320C, and 320D.

The moving bar 385 is extended from the yoke member 390, and is formed to be movable in the axial direction.

The slide bar 377 has one end fixed to the moving bar 385 and the other end slidably connected to the tie bar 361.

The operating link is formed to move the slide bar 377 by the second motor 354. In FIG. 7, the operating link includes a link swing unit 374 having one end fixed to the output shaft 355 of the second motor 354, a link driven unit 375 having one end connected to the other end of the link swing unit 374, and an extension type operating bar 376 connected to the link driven unit 375 and having an end portion formed to apply force in a direction in which the slide bar 377 may be slid.

Due to the second tilting operating unit described above, when the second motor 354 rotates, a torque of the second motor 354 is converted into spatial movement of the extension type operating bar 376 by the link swing unit 374 and the link driven unit 375. Since both ends of the extension type operating bar 376 are bound by the tie bars 361, movement of the extension type operating bar 376 becomes linear slide movement. Moving force of the extension type operating bar 376 is transferred to the slide bars 377, and movement of the slide bars 377 is transferred to the moving bars 385 and the yoke members 390 and is finally converted simultaneously into rotation of the first to fourth rotors 320A, 320B, 320C, and 320D depending on the second tilting axis $X_2$ through the torque transfer members 391.

As described above, the first tilting operating unit and the second tilting operating unit are configured independently from each other without causing interference therebetween, and a sufficient space is provided at the time of pivoting the rotors 320A, 320B, 320C, and 320D.

Figure 8:
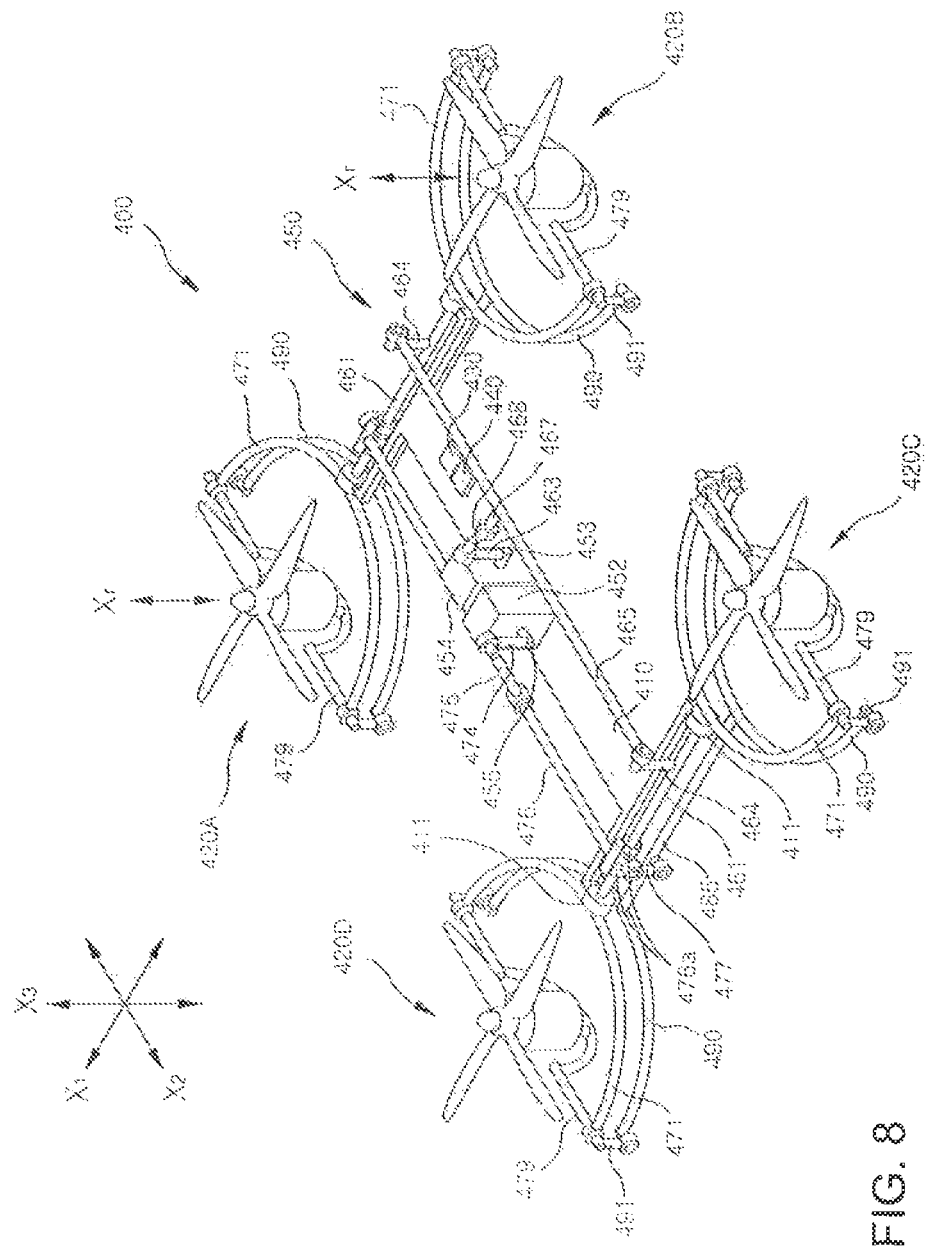
FIG. 8 is a perspective view of a multi-rotor flying object 400 according to a fourth exemplary embodiment of the present invention.

FIG. 8 is a perspective view of a multi-rotor flying object 400 according to a fourth exemplary embodiment of the present invention.

In the present exemplary embodiment, a form in which a second link 465 constituting a first tilting operating unit is extended in an integral shape is illustrated. That is, the second link 465 is formed so that one end thereof may be connected to a third link 464 fixed to a portion at which a tie bar 461 of a first swivel element and a tie bar 461 of a second swivel element are connected to each other and the other end thereof may be connected to a third link 464 fixed to a portion at which a tie bar 461 of a third swivel element and a tie bar 461 of a fourth swivel element are connected to each other.

A first link includes a link swing unit 463 fixed to an output shaft 453 of a first motor 452, a link driven unit 468 connected to an end portion of the link swing unit 463, and a fixed member 467 having one end connected to the link driven unit 468 and the other end fixed to the second link 465. Therefore, when the first motor 452 rotates, the fixed member 467 and the second link 465 move by the link swing unit 463 and the link driven unit 468, and moving force of the second link 465 acts as a torque rotating the tie bar 461 of the third link 464. The tie bars 461 rotate together with yoke frames 471 and rotors 420A, 420B, 420C, and 420D around a first tilting axis $X_1$.

Meanwhile, in FIG. 8, couplers 476a formed to enclose end portions of slide bars 477 are provided at end portions of an extension type operating bar 476. Therefore, even though the extension type operating bar 476 is not directly connected to the slide bar 477, force transferred to the extension type operating bar 476 may be transferred to the slide bar 477 in all directions.

Figure 9:
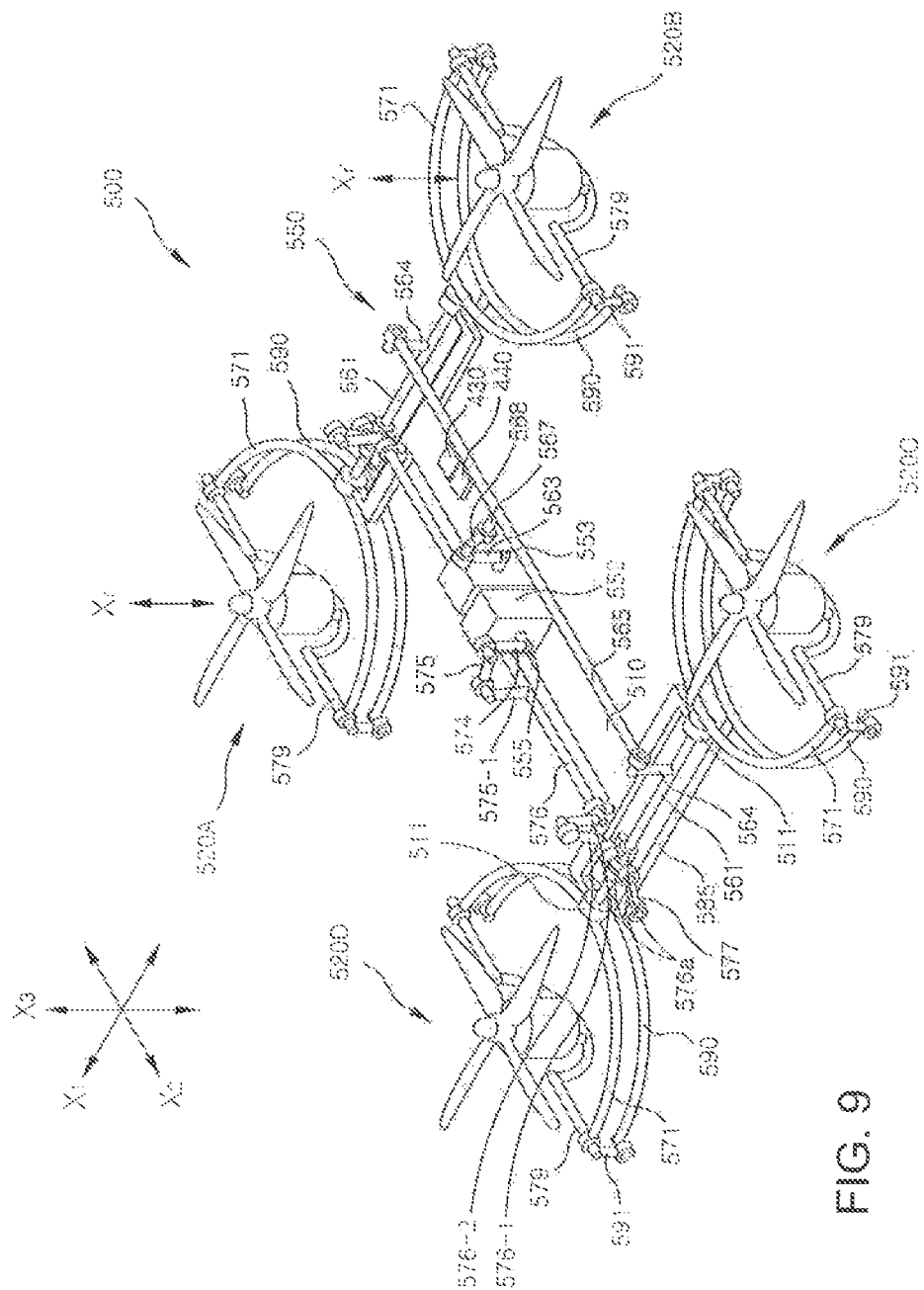
FIG. 9 is a perspective view of a multi-rotor flying object 500 according to a fifth exemplary embodiment of the present invention.

FIG. 9 is a perspective view of a multi-rotor flying object 500 according to a fifth exemplary embodiment of the present invention.

In the present exemplary embodiment, an example in which an operating link constituting a second tilting operating unit includes a link swing unit 574, a link driven unit 575, a fixed member 575-1, and an extension type operating bar 576 is illustrated. The link swing unit 574 is fixed to an output shaft 555 of a second motor 554. One end of the link driven unit 575 is connected to the other end of the link swing unit 574. The fixed member 575-1 has one end connected to the link driven unit 575 and the other end fixed to the extension type operating bar 576.

The extension type operating bar 576 is formed so that end portions thereof may apply force in a direction in which slide bars 577 may be slid. In detail, the extension type operating bar 576 may be extended and formed in an integral shape so that one end thereof is rotatably supported at a portion at which a tie bar 561 of a first swivel element and a tie bar 561 of a second swivel element are connected to each other and the other end thereof is rotatably supported at a portion at which a tie bar 561 of a third swivel element and a tie bar 561 of a fourth swivel element are connected to each other. Fourth links 576-1 are connected to both ends of the extension type operating bar 576, and fifth links 576-2 are connected to end portions of the fourth links 576-1. Couplers 576a formed to enclose the slide bars 577 are provided at end portions of the fifth links 576-2. Due to the configuration described above, when the second motor 554 is operated, the fixed member 575-1 and the extension type operating bar 576 rotate by the link swing unit 574 and the link driven unit 575, and the rotation of the extension type operating bar 576 is converted into force sliding the slide bar 577 through the fourth link 576-1, the fifth link 576-2, and the coupler 576a.

Figure 10:
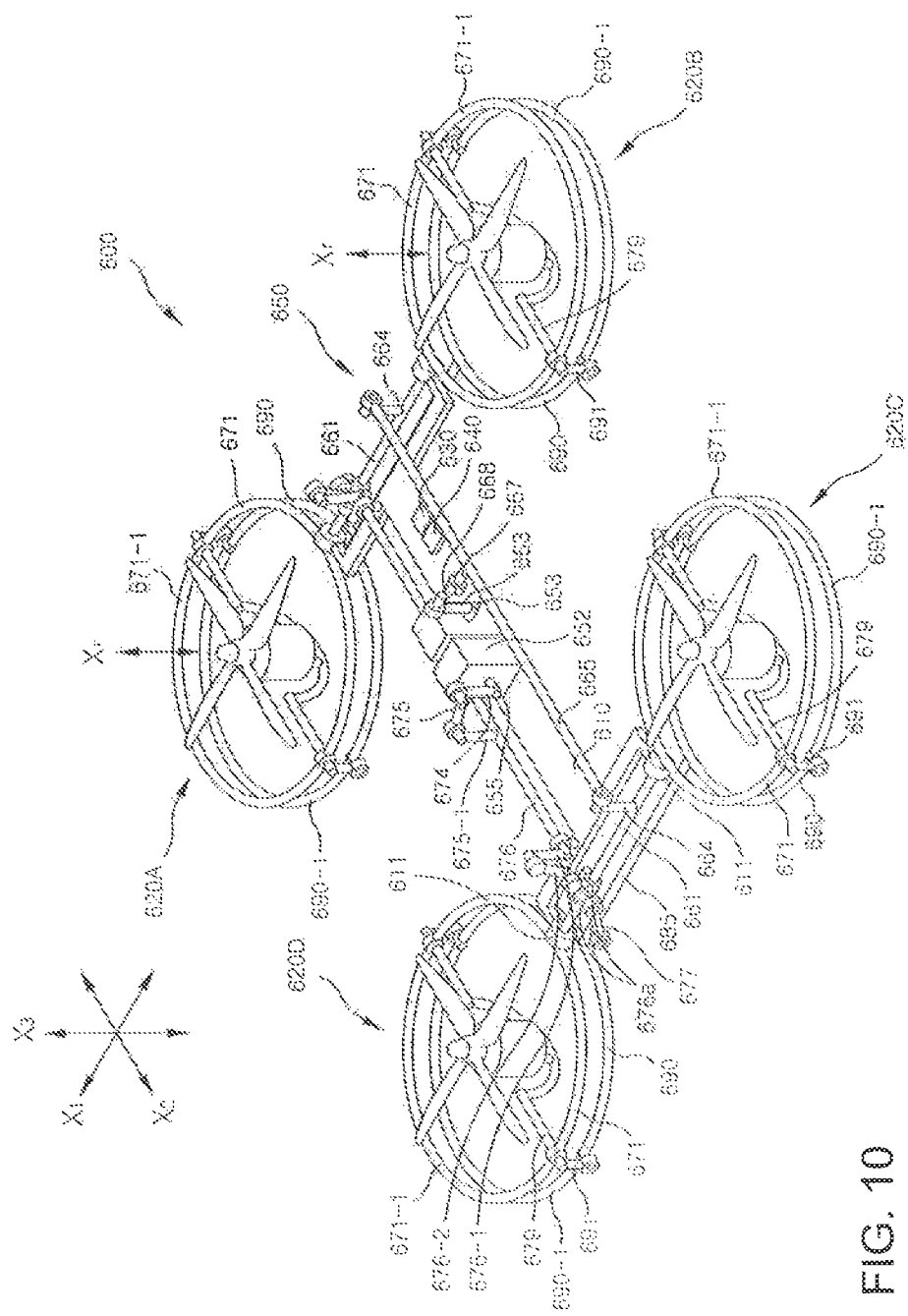
FIG. 10 is a perspective view of a multi-rotor flying object 600 according to a sixth exemplary embodiment of the present invention.

FIG. 10 is a perspective view of a multi-rotor flying object 600 according to a sixth exemplary embodiment of the present invention.

In the present exemplary embodiment, an example in which yoke frames 671 and yoke members 690 are formed in an 'O' shape so as to completely enclose first to fourth rotors 620A, 620B, 620C, and 620D and are disposed in parallel with each other is illustrated. This configuration may improve a support property of the rotors 620A, 620B, 620C, and 620D, a prevention property of shaking depending on a direction change, or a mounting property of an air guide or a shroud.

The multi-rotor flying objects as described above are not limited to the configurations and the operation schemes of the above-mentioned exemplary embodiments. The above-mentioned exemplary embodiments may be configured so that various modifications may be made by selective combinations of all or some of the respective exemplary embodiments.

The invention claimed is:
1. A multi-rotor flying object comprising:
 a body;
 a plurality of rotor units, each of the plurality of rotor units including a propeller and a power unit for driving the propeller; and
 a steering unit including a connection member connecting the plurality of rotor units to each other and an actuator installed on the body and activating the connection member to allow the plurality of rotor units to be simultaneously inclined at a same angle with respect to the body;
 wherein the actuator includes a first motor and a second motor and the connection member includes:
  a first connection unit transferring a torque by the first rooter to the plurality of rotor units to rotate the plurality of rotor units around n axis in a first direction; and a second connection unit transferring torque by the second motor to the plurality of rotor units to rotate the plurality of rotor units around an axis in a second direction corresponding to a direction intersecting with the first direction;

the first connection unit includes:
   a first link unit fixed to the rotor unit and installed on the body so as to be rotatable around the axis in the first direction; and
   a second link unit formed to transfer the torque of the first motor to the first link unit.

2. The multi-rotor flying object of claim 1, wherein the plurality of rotor units are disposed to be symmetrical to each other on a basis of the body.

3. The multi-rotor flying object of claim 1, wherein the connection member is connected to a center of gravity of the rotor unit.

4. The multi-rotor flying object of claim 1, wherein the second direction is a direction perpendicular to each of the first direction and a shaft direction of the power unit.

5. The multi-rotor flying object of claim 1, wherein the first connection unit and the second connection unit are disposed in a symmetrical form on a basis of the body, respectively, to allow the body to maintain horizontality.

6. The multi-rotor flying object of claim 1, wherein the second link unit is connected to each of a shaft of the first motor and the first link unit to allow an angle by which the rotor unit rotates around the axis in the first direction to be the same as a rotation angle of the shaft of the first motor.

7. The mufti-rotor flying object of claim 6, wherein the second link unit includes:
   a first shaft fixed to the shaft of the first motor;
   a second shaft fixed to the first link unit and having a same length as that of the first shaft; and
   a third shaft disposed in parallel with a plane passing through the shaft of the first motor and the first link unit, and rotatably connected to each of the first shaft and the second shaft to allow an inclined angle of the first shaft to be the same as that of the second shaft in the case in which the shaft of the first motor rotates.

8. A multi-rotor flying object comprising:
a body;
a plurality of rotor units, each of the plurality of rotor units includinq a propeller and a power unit for driving the propeller; and
a steering unit including a connection member connecting the plurality rotor units to each other and an actuator installed on the body and activating the connection member allow the plurality of rotor units to be simultaneously inclined at a same angle with respect to the body;
wherein the actuator includes a first motor and a second motor, and the connection member includes:
   a first connection unit transferring a torque by the first motor to the plurality of rotor units to rotate the plurality of rotor units around an axis in a first direction; and
   a second connection unit transferring a torque by the second motor to the plurality of rotor units to rotate the plurality of rotor units around an axis in a second direction corresponding to a direction intersecting with the first direction;
the second connection unit includes:
   a third link unit connected to the rotor unit so as to be rotatable around the axis in the second direction; and
   a fourth link unit transferring the torque by the second motor to the rotor unit to allow the rotor unit to be inclined.

9. The multi-rotor flying object of claim 8, wherein the fourth link unit is connected to each of a shaft of the second motor and the rotor unit to allow an angle by which the rotor unit rotates around the axis in the second direction to be the same as a rotation angle of the shaft of the second motor.

10. The multi-rotor flying object of claim 9, wherein the third link unit is rotatably connected to one point on a plane passing through the center of gravity of the rotor unit, and the fourth link unit includes:
   a fourth shaft fixed to the shaft of the second motor;
   a fifth shaft rotatably connected to the fourth shaft;
   a sixth shaft rotatably connected to the fifth shaft and formed to be slidable in the first direction; and
   a seventh shaft having the same length as that of the fifth shaft, and rotatably connected to each of the sixth shaft and the rotor unit, such that the seven shaft is displaced by sliding of the sixth shaft in the case in which the shaft of the second motor rotates, thereby forming an angle corresponding to an inclined angle of the fifth shaft.

11. The multi-rotor flying object of claim 1, further comprising a control unit individually controlling rotational speeds of each of the power units of the plurality of rotor units.

12. The multi-rotor flying object of claim 1, further comprising:
   a communication unit receiving a control signal for controlling the steering unit; and
   a control unit adjusting a rotational angle of a shaft of the actuator based on the control signal received from the communication unit.

13. A multi-rotor flying object comprising:
   a body having a first motor and a second motor;
   a first rotor, a second rotor, a third rotor, and a fourth rotor arranged in a circumferential direction of the body so as to be spatially spaced apart from each other on a basis of the body;
   first, second, third and fourth swivel elements formed to support the first, the second, the third and the fourth rotors to the body, respectively, and configured in a form in which the first, the second, the third and the fourth rotors have a first tilting axis (X1) and a second tilting axis (X2) independent from the first tilting axis (X1), the first swivel element and the second swivel element being connected to each other and the third swivel element and the fourth swivel element being connected to each other;
   a first tilting operating unit connecting the first motor and the first, the second, the third and the fourth swivel elements to each other so that the first, the second, the third and the fourth rotors are simultaneously tilted around the first tilting axis (X1) by driving force of the first motor; and
   a second tilting operating unit connecting the second motor and the first, the second, the third and the fourth swivel elements to each other so that the first, the second, the third and the fourth rotors are simultaneously tilted around the second tilting axis (X2) by driving force of the second motor.

14. The multi-rotor flying object of claim 13, wherein the first, the second, the third and the fourth swivel elements include;
   fixed frames each fixing the first, the second, the third and the fourth rotors;

yoke Frames supporting the fixed frames so as to be pivotable around the second tilting axis (X2) and formed to provide pivot spaces of the first, the second, the third and the fourth rotors;

tie bars extended from the yoke frames; and pivot units formed to support the tie bars so as to be pivotable around the first tilting axis (X1), the tie bar of the first swivel element and the tie bar of the second swivel element are connected to each other, and the tie bar of the third swivel element and the tie bar of the fourth swivel element are connected to each other.

15. The multi-rotor flying object of claim 14, wherein the first tilting operating unit includes:
    a first link having one end fixed to an output shaft of the first motor;
    second links connected to the other end of the first link and extended up to the tie bars; and
    third links each having one end connected to the tie bars and the other end connected to the second links.

16. The multi-rotor flying object of claim 15, wherein the second link is extended and formed in an integral shape so that one end thereof is connected to the third link fixed to a portion at which the tie bar of the first swivel element and the tie bar of the second swivel element are connected to each other and the other end thereof is connected to the third link fixed to a portion at which the tie bar of the third swivel element and the tie bar of the fourth swivel element are connected to each other, and
    the first link includes a first link swing unit fixed to the output shaft of the first motor, a first link driven unit connected to an end portion of the first link swing unit, and a first fixed member having one end connected to the first link driven unit and the other end fixed to the second link.

17. The multi-rotor flying object of claim 14, wherein the second tilting operating unit includes:
    a pair of torque transfer members connected to both ends of the fixed frame in order to transfer a torque for pivoting the fixed frame around the first tilting axis;
    a yoke member having both ends connected to the pair of torque transfer members, moving in an axial direction, and formed to transfer force to the torque transfer members;
    a moving bar extended from the yoke member and formed to be movable in the axial direction;
    a slide bar having one end fixed to the moving bar and the other end slidably connected to the tie bar; and
    an operating link formed to move the slide bar by the second motor.

18. The multi-rotor flying object of claim 17, wherein the yoke frames and the yoke members are formed in a 'C' shape, respectively, and are disposed in parallel with each other.

19. The multi-rotor flying object of claim 17, wherein the yoke frames and the yoke members are formed in an 'O' shape, respectively, so as to completely enclose the first, the second, the third and the fourth rotors, respectively, and are disposed in parallel with each other.

20. The multi-rotor flying object of claim 17, wherein the operating link includes:
    a second link swing unit having one end fixed to an output shaft of the second motor;
    a second link driven unit having one end connected to the other end of the second link swing unit;
    a second fixed member having one end connected to the second link driven unit; and
    an extension type operating bar having one portion to which the second fixed member is fixed and having an end portion formed to apply force in a direction in which the slide bar is slid.

21. The multi-rotor flying object of claim 20, wherein first couplers formed to enclose the slide bars are further provided at end portions of the extension type operating bar.

22. The multi-rotor flying object of claim 20, wherein the extension type operating bar is extended and formed in an integral shape so that one end thereof is rotatably supported at a portion at which the tie bar of the first swivel element and the tie bar of the second swivel element are connected to each other and the other end thereof is rotatably supported at a portion at which the tie bar of the third swivel element and the tie bar of the fourth swivel element are connected to each other,
    fourth links are connected to both ends of the extension type operating bar,
    fifth links are connected to end portions of the fourth links, and
    second couplers formed to enclose the slide bars are provided at end portions of the fifth links.

* * * * *